United States Patent [19]

Persoon et al.

[11] Patent Number: 5,326,311
[45] Date of Patent: Jul. 5, 1994

[54] METHOD FOR CONTROLLING THE PROCESSING OF POULTRY, AND DEVICE FOR CARRYING OUT THIS METHOD

[75] Inventors: Nicolaas W. C. Persoon, Rotterdam; Adrianus J. van den Nieuwelaar, Gemert, both of Netherlands

[73] Assignee: Stork PMT B.V., Boxmeer, Netherlands

[21] Appl. No.: 630,315

[22] Filed: Dec. 19, 1990

[51] Int. Cl.⁵ ............................................. A22C 21/00
[52] U.S. Cl. ................................. 452/184; 452/157; 209/577
[58] Field of Search ............... 452/177, 182, 183, 184, 452/157; 209/576, 577

[56] References Cited

U.S. PATENT DOCUMENTS

| | | | |
|---|---|---|---|
| 3,890,221 | 6/1975 | Muehlethauer | 209/577 |
| 4,150,374 | 4/1979 | Brook | 452/177 |
| 4,187,945 | 2/1980 | Altenpohl et al. | 452/184 |
| 4,483,047 | 11/1984 | Linville, Jr. | 452/184 |
| 4,627,007 | 12/1986 | Muscany | 364/550 |
| 4,706,336 | 11/1987 | Hartmann et al. | 452/177 |
| 4,813,101 | 3/1989 | Brakels et al. | 452/184 |
| 4,856,144 | 8/1989 | De Greef | 452/182 |
| 4,875,254 | 10/1989 | Rudy et al. | 452/157 |
| 4,915,827 | 4/1990 | Rosenthal | 209/577 |
| 4,946,045 | 8/1990 | Ditchburn et al. | 209/576 |
| 5,077,477 | 12/1991 | Stroman et al. | 209/577 |

FOREIGN PATENT DOCUMENTS

| | | |
|---|---|---|
| 259920 | 3/1983 | European Pat. Off. ..... A22C 21/00 |
| 0321981 | 6/1989 | European Pat. Off. . |
| 2728913 | 1/1979 | Fed. Rep. of Germany . |

*Primary Examiner*—Willis Little
*Attorney, Agent, or Firm*—Deveau, Colton & Marquis

[57] ABSTRACT

A method for controlling the processing of poultry in different production lines operating in parallel, wherein the control of the processing of a specific bird or a part thereof takes place on the basis of data derived from one or more observed contours of the bird or a part thereof. For purposes of the control the data may be supplemented by the weight of the bird or part thereof. In a device for carrying out the method the observation takes place with the aid of one or more radiation sources which transmit radiation rays to one or more radiation detectors, which radiation rays can be interrupted or weakened by the birds or parts thereof passing therethrough.

5 Claims, 3 Drawing Sheets

METHOD FOR CONTROLLING THE PROCESSING OF POULTRY, AND DEVICE FOR CARRYING OUT THIS METHOD

BACKGROUND OF THE INVENTION

This invention relates to a method for controlling the processing of poultry in different production lines operating in parallel. The invention also relates to a device for carrying out this method.

DISCUSSION OF THE PRIOR ART

The processing of poultry in a slaughterhouse takes place using different machines, each of which carries out a specific operation on a bird or part of a bird. These machines, which, for example, cut off heads, cut off necks, eviscerate the birds and joint the carcass, are arranged in a logical sequence along conveyor lines, and thus form production lines along which the birds are conveyed, hanging by the two legs from a hook, in order to undergo the successive processing operations.

The poultry supplied to the slaughterhouse is not uniform in body build and/or weight, even if it comes from the same flock (a collection of birds raised together), which means, for example, that variations of up to 20% in the size of body parts may occur between individual birds coming from the same flock or reared under comparable conditions.

On the other hand, a great variety of products is desired by the customers of the slaughterhouse.

In order to make it possible to meet current customer demands in the optimum manner, bifurcations are fitted at certain points on the conveyor lines, which bifurcations are in general formed by automatic overhang machines which are known per se, and where according to the state of the art it is decided on the basis of the weight of each bird and/or on the basis of a visual inspection which conveyance route must be followed from the bifurcuration.

It is important here that the most suitable processing should be carried out on the birds on the machine most suitable for that purpose, resulting in the maxium production output. By the known method it is only possible to a very limited extent to guide each bird or part of a bird to the most suitable processing machine, i.e. at a bifurcation in a conveyor line to determine the most suitable path to control an automatic overhang machine, because the means for determining the characteristics of the birds (shape, size of the breast and/or the legs, injuries etc.) on the basis of which a decision has to be made are non-existent or, in the case of a visual inspection, are inadequate, in particular at high speeds at which the birds are conveyed along the conveyor line.

SUMMARY OF THE INVENTION

It is now the object of the method and device according to the invention to eliminate the above-mentioned disadvantages.

This object is attained according to the invention in that the control of the processing of a specific bird or a part thereof takes place on the basis of data derived from one or more observed contours of the bird or a part thereof.

Determining a contour of a bird or part thereof, possibly combined with the determination of its weight, produces important advantages. Important data for controlling the processing of poultry can be derived from the contour, which is an image of a boundary of a bird or a part thereof, at right angles to the direction of observation.

If a choice has to be made between which of two or more identical machines operating in parallel and set for different bird sizes a bird or a part thereof must be fed to for optimum processing, it is possible on the basis of the data obtained to select a machine which is best suited to the specific size of the bird or a part thereof. The data can, of course, also be used directly for controlling the setting of a processing machine adapted to it.

For a bird, such data preferably comprises the position of the neck/head transition, the shoulder/neck transition, the hip joints and the rump. The neck/head transition gives the correct position for cutting off the head, the shoulder/neck transition gives the correct position for cutting off the neck, the hip joints form a reference for cutting off legs and jointing, and the position of the rump, together with the position of the shoulder/neck transition, is particularly important as a reference point for evisceration.

If the observation takes place while the birds or parts thereof are in motion, the production need not be interrupted for it.

A device by which the above-mentioned observation can be carried out effectively comprises one or more radiation sources which transmit radiation rays to one or more radiation detectors, which radiation rays can be interrupted or weakened by the birds or parts thereof. A bird moving past can interrupt or weaken the radiation rays and thus modulate the output signal of one or more detectors. The interpretation of the detector output signals produces the contour of the bird or a part thereof, at right angles to the radiation rays. Using image analysis techniques, it is possible to establish from the observed contour not only the positions of body parts of the birds, but also any damage (for example, a broken wing) or other irregularities.

The radiation used for the observation may comprise visible or non-visible radiation or a combination of different kinds of radiation, depending on the part of the bird to be observed. For the observation of contours of internal parts of the body, e.g. bones or organs, Röntgen radiation may be used. For the observation of contours of body outer parts the radiation preferably consists of visible light or infrared radiation.

In a preferred embodiment the observation takes place with the aid of a row of radiation sources which transmit parallel radiation rays to a row of radiation detectors. With this embodiment a combination of the various detector output signals can be interpreted to produce the contour of the bird or a part thereof.

The position in which birds are fed through the radiation rays will generally be upside down, hanging by both legs from a hook which is movable in a conveyor line. Then, advantageously, the row of radiation sources as well as the row of radiation detecors are set up vertically. Other positions of the bird or part thereof are, of course, also possible for certain operations, for example on the back for filleting the breast, where the method according to the invention can be used to advantage.

The most contour data are obtained if the radiation rays lie at right angles to the breast side or the back side of a bird, since in that case the fewest number of body parts will be situated at the shadow side of the birds or parts thereof, where they cannot be detected.

Of course, it is possible to determine various contours of a bird or a part thereof, e.g. a leg, from different observation directions, so that the surface of the piece of poultry can be reconstructed in more than two dimensions with the aid of suitable calculating devices. This could be, for example, observation of the birds at the breast side and at a hip side, to determine the breast dimensions.

The claims and advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
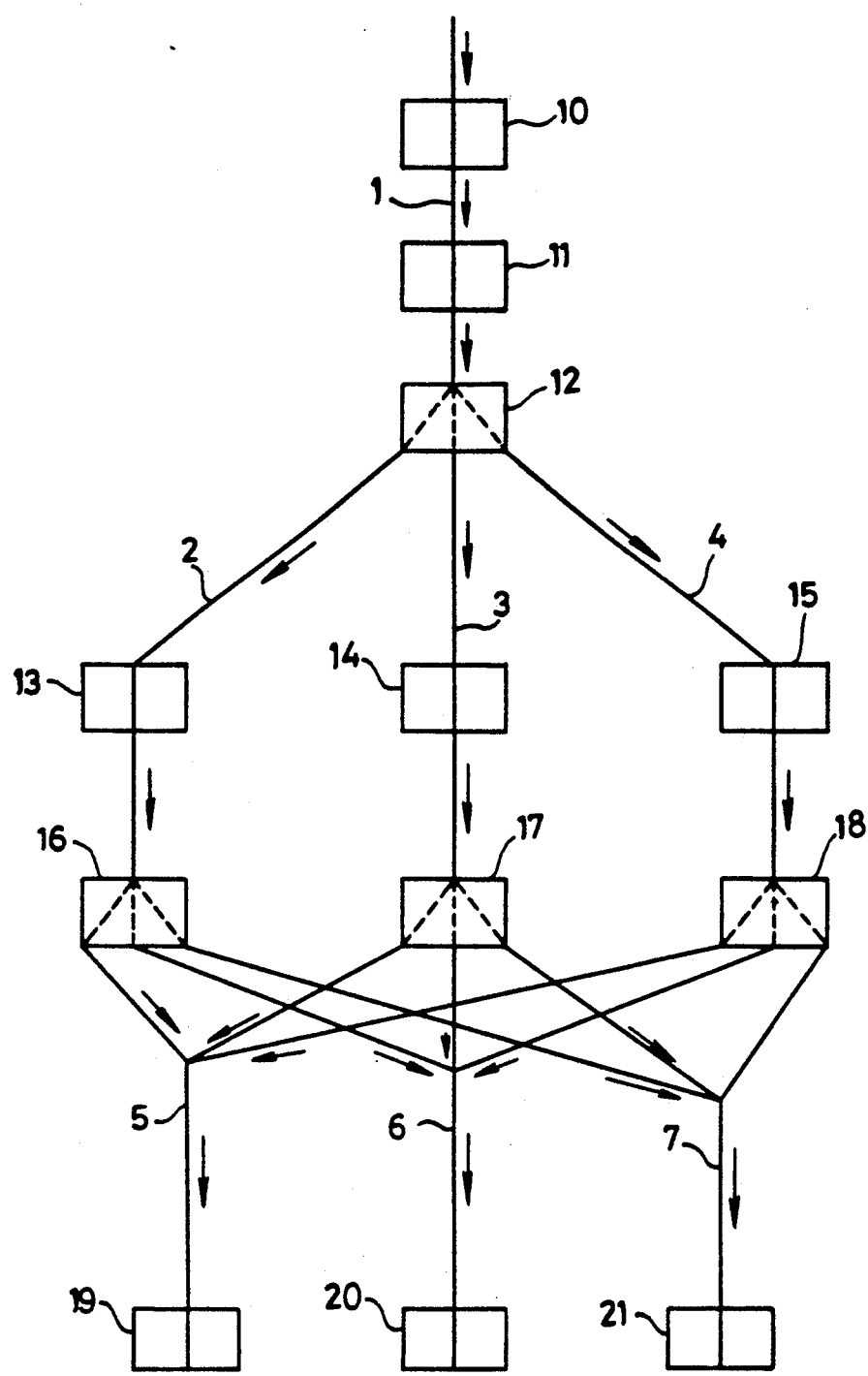
FIG. 1 shows a schematic general view of a possible arrangement of processing machines e.g. processing stations, in a slaughterhouse.

FIG. 1 schematically shows an arrangement of processing machines, indicated by rectangular boxes, placed on conveyor lines 1, 2, 3, 4, 5, 6 and 7, along which birds or parts thereof are carried in the direction indicated by arrows.

In processing machine 10 the still live birds fed in are stunned and stuck, following which the birds are left to bleed dry. The birds are then plucked in processing machine 11.

At bifurcation 12 between the conveyor lines it must then be determined to which oven-ready line 13, 14 or 15 the birds are to be conveyed. The oven-ready lines 13, 14 and 15 are each set for a specific size of bird; oven-ready line 13 is, for example, set for relatively small birds, oven-ready line 14 for medium-sized birds, and oven-ready line 15 for relatively large birds.

Before the bifurcation 12 the contour and weight of a bird are determined, following which an overhang machine in bifurcation 12 is controlled in such a way that each bird is conveyed on conveyor line 2, 3 or 4 to the respective oven-ready line 13, 14 or 15 of which the setting is most suitable for the processing of that bird. The bifurcation, like other bifurcations, contains buffers which prevent one of the following conveyor lines from being supplied with too many birds which cannot be processed.

Bifurcations 16, 17 and 18 respectively are placed at the end of the conveyor lines 2, 3 and 4 passing through the oven-ready line, in order to make it possible to take birds, for example, along conveyor line 5 to a processing station 19 for damaged birds, along conveyor line 6 to a processing station 20 for undamaged birds of a certain weight, with the object of smoking or deepfrying them there, or along conveyor line 7 to processing station 21 for removal of certain parts of the body, for example the breast or the legs.

The bifurcations 16, 17 and 18 are preceded by determination of the contour and the weight of each bird or part thereof conveyed there, and on the basis of these data an overhang machine in the bifurcations 16, 17 and 18 is controlled, so that each bird is conveyed to the processing station 19, 20 or 21 for which the bird is most suitable.

Figure 2:
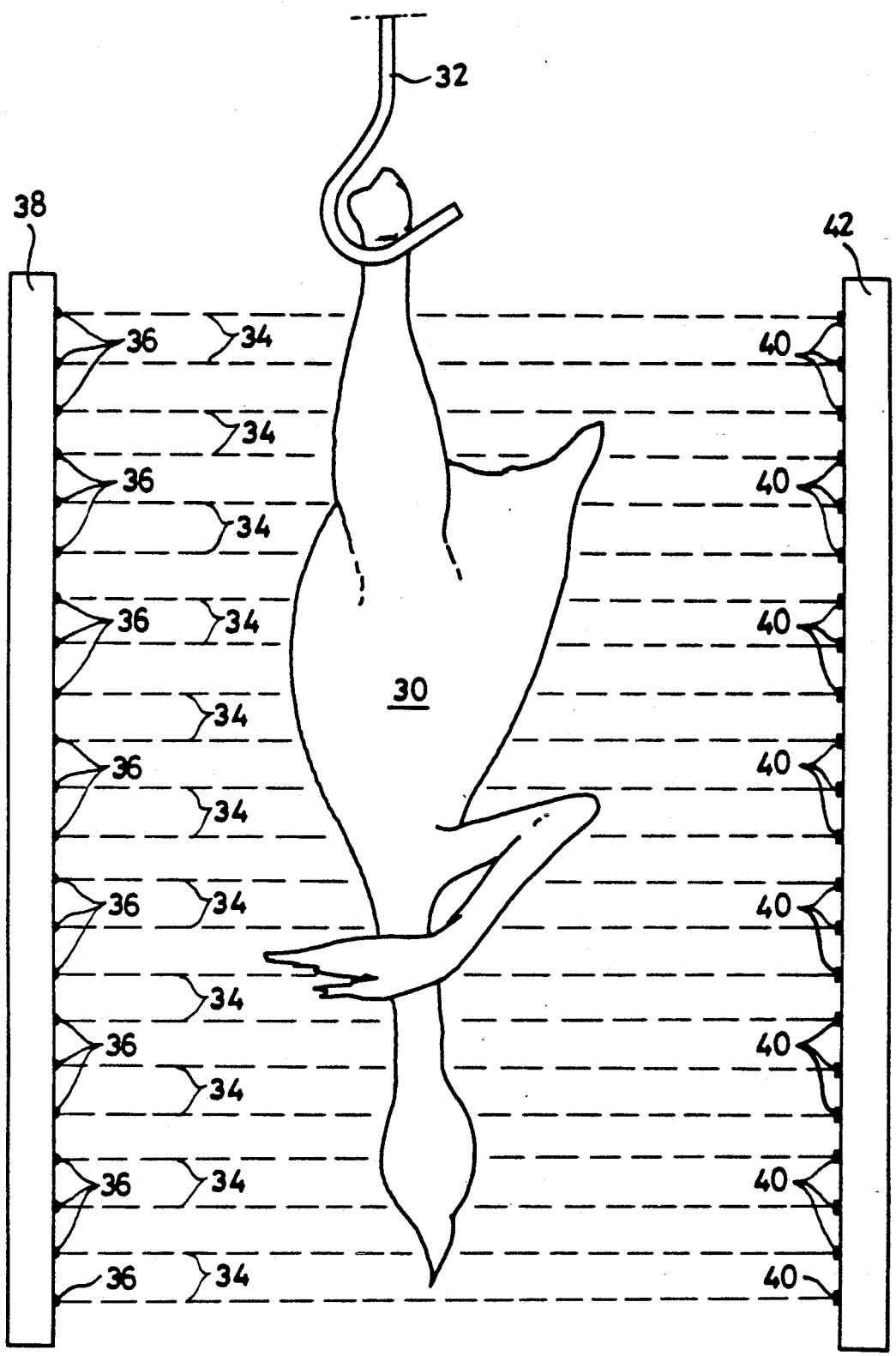
FIG. 2 shows a front view of a preferred embodiment of the device according to the invention.

FIG. 2 shows a bird 30, hanging by the legs from a hook 32, which bird is guided through a plurality of parallel radiation rays 34 in a direction at right angles to the plane of the drawing. The radiation rays 34 come from radiation sources 36 which are fitted on a bar 38, and are directed at the same number of radiation detectors 40 fitted on a bar 42. If the bird is guided through the plurality of radiation rays 34, the radiation from the radiation sources 36 on the radiation detectors 40 will be interrupted or weakened in a certain pattern. This is discussed in greater detail with reference to FIGS. 3 and 4.

Figure 3:
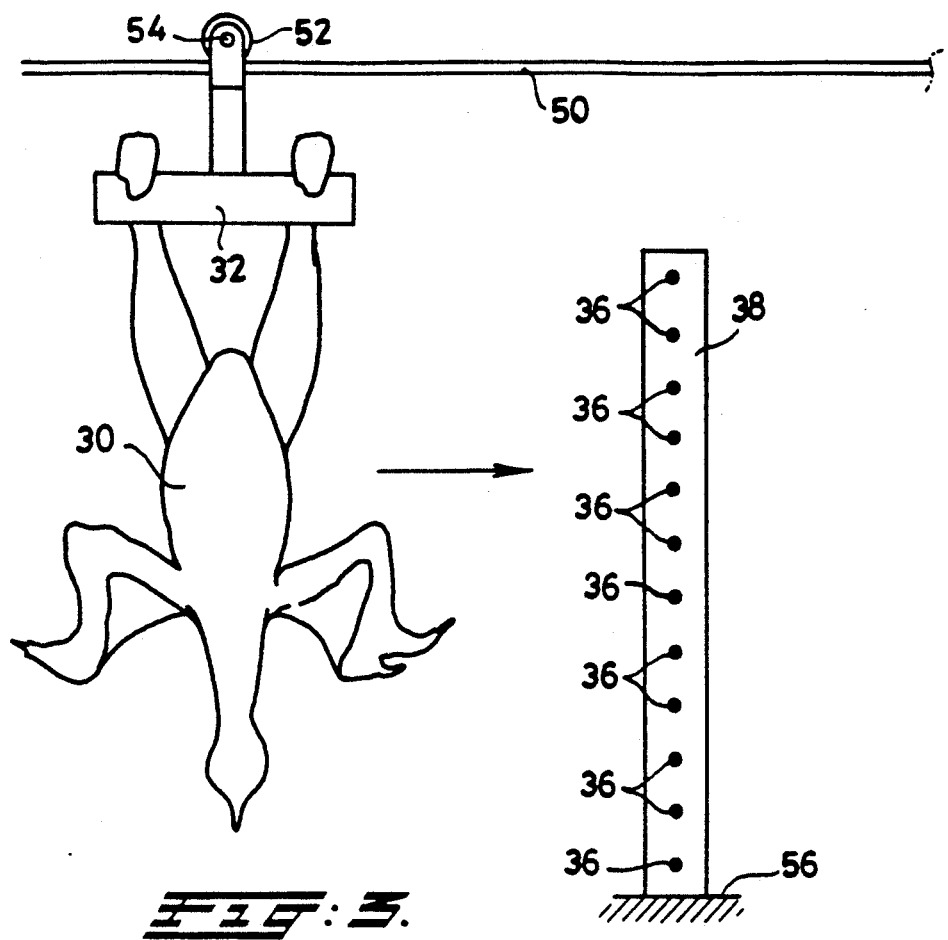
FIG. 3 shows a side view of a part of a similar device to that of FIG. 2.

FIG. 3 shows the bird 30 hanging from the hook 32 being moved along a conveyor rail 50 at a certain speed in the direction of the arrow, by drive means which are not shown in any further detail. The hook 32 is for this purpose provided with a roller 52 which is rotatable about a shaft 54. The bird 30 is moved past in front of a bar 38 disposed on a fixed base 56, on which bar 38 twelve light sources 36 which emit light rays are fitted at right angles to the direction of conveyance. The bird 30 thus temporarily interrupts the light rays coming from the light sources 36.

The output signal thus produced by the twelve light detectors (not shown) belonging to the light sources is shown in FIGS. 4A to 4L, in which FIG. 4A represents the output signal from the light detector belonging to the uppermost light source 36, FIG. 4B the output signal from the light detector belonging to the light source 36 below it, and so on. FIGS. 4A to 4L also indicate by L ("light") the signal level going with the receipt of light from the light source 36, while the signal level going with the absence of light is indicated by D ("dark"). The time t is plotted on the horizontal axis.

Figure 4:
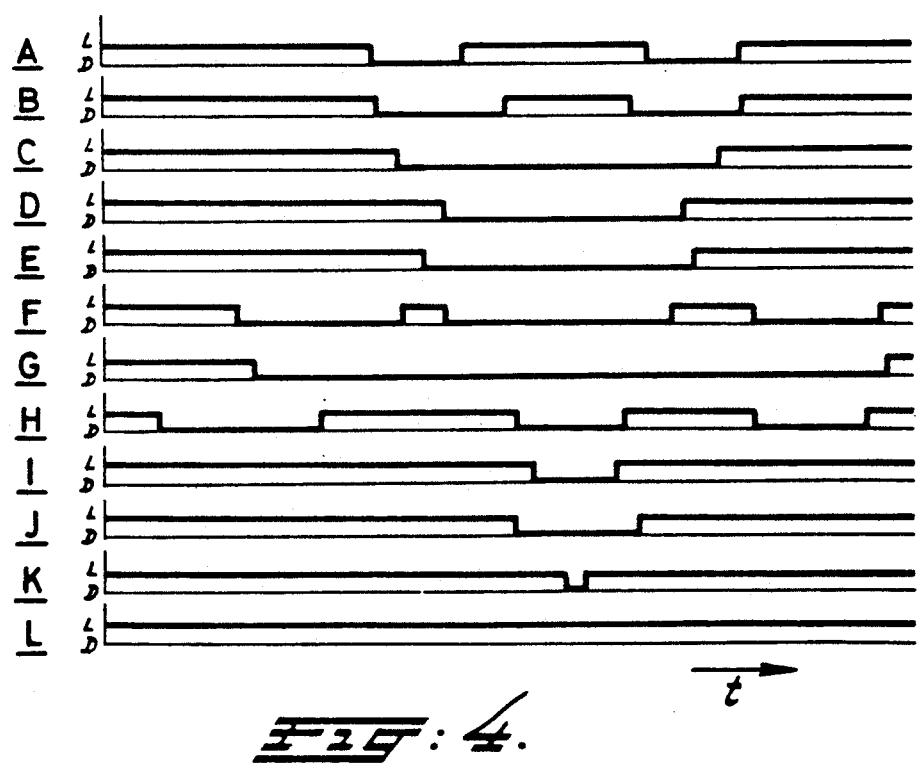
FIGS. 4A to 4L show time charts of signals from the detectors of FIG. 3.

It can be seen from FIGS. 3 and 4 that a horizontal dimension of the bird at the level of a light source can be determined by multiplying the dark period of time in the appropriate light detector by the average horizontal speed of the bird during the period. The accuracy of the measurement is limited by the dimensions of the components in the optical circuit. Since the light sources are discrete, also in the vertical direction a limited resolution is achieved. For example, it can be deduced from the combination of the signals according to FIGS. 4B and 4C, through halving of the light interruption frequency, that the rump of the bird 30 is lying at a level somewhere between the level of the corresponding light detectors. The uncertainty in the level determination thus amounts to the center-to-center distance between the light sources/light detectors plus the dimensions of the components in the optical circuit, and can be reduced by selecting a greater density of light sources and light detectors in the vertical direction and/or using smaller components.

The contour of each bird can be determined in this way. The position of the hip joint within the contour can also be determined approximately from the shortening and the lengthening of the duration of the dark period when the signals according to FIGS. 4C, 4D and 4E are compared.

The position of the neck/head transition on the contour follows from the shortening and lengthening of the dark period when the signals according to FIGS. 4J, 4I and 4H are compared.

The position of the neck/shoulder transition on the contour follows from comparisons of the duration of the dark period in the signals according to FIGS. 4G and 4H.

It will be obvious to those skilled in the art that many variations may be made in the embodiment herein chosen for the purpose of illustrating the present invention, and for result may be had to the Doctrine of Equivalents without departing from the scope of the present invention as defined by the appended claims.

What is claimed is:

1. A method for processing poultry, such as whole poultry or parts thereof, comprising the steps of:
   moving the poultry or poultry part along a path of conveyance in a controlled orientation;
   directing radiation across the path of conveyance the poultry or poultry part, the radiation being directed essentially at right angles to the breast side or backside of the bird;
   detecting radiation from the path of the poultry or poultry part to develop at least one observed contour of at least a portion of the poultry or poultry part;
   evaluating the observed contour to establish the shape of at least a portion of the poultry or poultry part; and
   controlling the processing of the poultry or poultry part in response to the shape of at least a portion of the poultry or poultry part;

2. A method according to claim 1, further comprising the step of weighing the poultry ad wherein the step of controlling the processing is carried out in response to the observed contour and the weight of the poultry.

3. A method according to claim 1, wherein the observed contour is used to evaluate the position of the neck/head transition, the position of the shoulder/neck transition, the position of the hip joints and the position of the rump.

4. A method according to claim 1, wherein the observation takes place while the poultry is in motion.

5. A method for processing poultry, such as whole poultry or parts thereof, comprising the steps of;
   moving the poultry or poultry part along a path of conveyance in a controlled orientation;
   directing radiation across the path of conveyance the poultry or poultry part;
   detecting radiation from the path of the poultry or poultry part to develop at least one observed contour of at least a portion of the poultry or poultry part;
   evaluating the observed contour to establish the shape of at least a portion of the poultry or poultry part; and
   controlling the processing of the poultry or poultry part in response to the shape of at least a portion of the poultry or poultry part, wherein the poultry is selectively processed along different production lines operating in parallel and wherein the step of controlling the processing of the poultry comprises directing the poultry to a selected one of the production lines operating in parallel in response to the observed contour.

* * * * *